United States Patent
Powell, II et al.

[19]

[11] Patent Number: 6,055,436
[45] Date of Patent: Apr. 25, 2000

[54] METHOD AND APPARATUS FOR DETECTING SIMULCAST CHANNEL CONDITIONS

[75] Inventors: Clinton C. Powell, II, Lake Worth; Edgar Herbert Callaway, Jr., Boca Raton, both of Fla.

[73] Assignee: Motorola, Schaumburg, Ill.

[21] Appl. No.: 09/010,043

[22] Filed: Jan. 20, 1998

[51] Int. Cl.[7] .............................. H04B 7/005; H04B 15/00
[52] U.S. Cl. .................... 455/503; 455/553; 455/296; 455/254
[58] Field of Search ...................................... 455/503, 502, 455/458, 32.1, 38.1, 552, 553, 67.1, 226.1, 254, 296

[56] References Cited

U.S. PATENT DOCUMENTS

5,208,833  5/1993  Erhart et al. ............................... 375/20
5,873,044  2/1999  Goldberg et al. ......................... 455/503
5,930,248  7/1999  Langlet et al. ............................ 455/503

*Primary Examiner*—Nguyen Vo
*Attorney, Agent, or Firm*—Pablo Meles

[57] ABSTRACT

A circuit (350) for detecting simulcast channel conditions includes a symbol center averaging circuit (308) for providing a center count of excursions above and below at least a first predetermined threshold and for providing a moving average of the center count over a predetermined number of symbol periods and a symbol edge averaging circuit (310) for providing an edge count of excursions above and below at least a second predetermined threshold and for providing a moving average of the edge count over a predetermined number of symbol periods. Finally, the circuit further includes a comparison circuit (360) programmed to receive and compare the moving average of the center count and the moving average of the edge count to provide a control signal (380) for simulcast detection.

19 Claims, 6 Drawing Sheets

METHOD AND APPARATUS FOR DETECTING SIMULCAST CHANNEL CONDITIONS

FIELD OF THE INVENTION

The present invention is directed to a communication device, such as a selective call receiver, and more particularly to a communication device capable of detecting simulcast conditions for appropriate symbol decoding.

BACKGROUND OF THE INVENTION

When designing a communications system, it is often desired to cover an area larger than can be economically covered by a single transmitter site. In such cases, multiple transmitter sites are employed, each transmitting substantially the same data on substantially the same channel, in a process known as simulcasting. Due to differences in propagation delays and other factors, a receiver in the coverage area may receive signals from two or more transmitters at slightly different times, leading to a form of distortion known as Simulcast Delay Spread (SDS) distortion. Under certain conditions this distortion may become severe and corrupt the received data to an unacceptable degree.

Receiver modifications to reduce the effects of SDS distortion are known in the art; however, these modifications tend to degrade static (i.e., non-simulcast) sensitivity, adjacent channel selectivity, or other desirable receiver performance parameters. Conversely, methods of optimizing the receiver to achieve maximum static sensitivity tend to degrade the receiver's performance in the presence of SDS distortion.

Since it is difficult to simultaneously optimize a receiver for best SDS distortion and static sensitivity performance, a need exists for a method which can reliably discern between a simulcast and static channel at a receiver. If this were available, an adaptable receiver optimized for static sensitivity could be used that employed SDS distortion mitigation methods only when in a simulcast environment, and therefore achieve optimum performance in both static and simulcast environments.

DESCRIPTION OF A PREFERRED EMBODIMENT

Figure 1:
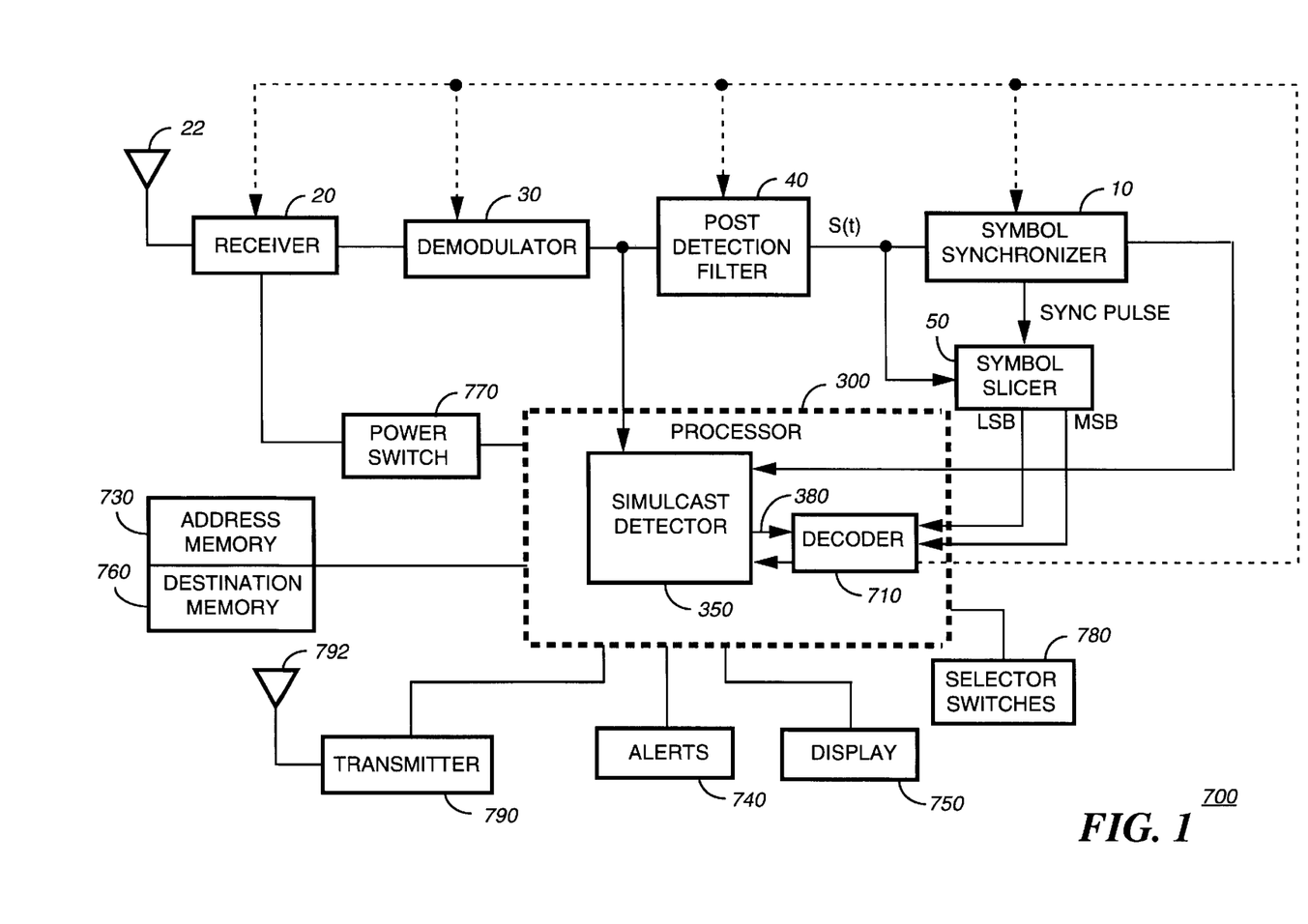
FIG. 1 is a block diagram of a selective call receiver including a simulcast detection circuit in accordance with the present invention.

FIG. 1 illustrates a selective call receiver (such as a pager) 700 utilizing a simulcast detection circuit 350 according to the present invention. The simulcast detection circuit 350 maybe part of a processor 300 that controls many of the functions required in a selective call receiver. It should be understood that the simulcast control function could be achieved through the use of a stand-alone simulcast detection circuit 350 without the use of the processor 300. In particular, the simulcast detection circuit 350 issues a simulcast detection signal 380 when a simulcast signal is detected to allow for appropriate filtering and other functions for optimum performance under various conditions.

The selective call receiver 700 comprises a receiver 20 for receiving RF signals detected by antenna 22. The received signal output by the receiver 20 is connected to the demodulator 30. The demodulator 30 outputs the demodulated signal to a post detection filter (PDF) 40, which ultimately outputs a filtered demodulated signal S(t) to a symbol synchronizer 10 and symbol slicer 50. The demodulator 30 also provides an output signal to the simulcast detection circuit 350. The symbol synchronizer 10 issues sync pulses to control when a symbol slicer 50 samples the filtered demodulated signal S(t) in order to compare the level of the demodulated signal (which may be digital or analog) with predetermined thresholds to output corresponding digital data, such as 2 level data ("0" or "1"), 4 level data ("00", "01", "11" or "10"), or in general m-level data. The symbol synchronizer is also coupled to the simulcast detector 350. The symbol synchronizer 10 preferably examines the slope of the demodulated signal S(t) for transitions between various levels such as shown in the method and apparatus described in a U.S. patent application having docket number PT02636U by Powell et al., entitled *Symbol Synchronizer Based on Eye Pattern Characteristics Having Variable Adaption Rate and Adjustable Jitter Control and Method Therefor*, which is assigned to the assignee of the present invention and hereby incorporated by reference. However, it should be appreciated by those with ordinary skill in the art that the techniques and circuitry is applicable to any m-level FM signal and that other techniques may be used with the present invention.

The processor 300 is a controller which may include a decoder 710 or decoder function that is preferably coupled to the symbol slicer 50 and decodes the digital data in accordance with protocol rules established for example, by Motorola's FLEX™ paging protocol. For example, the decoder outputs corresponding address information, message information and/or control information. The processor 300 is preferably either coupled to or incorporates the decoder 710 and is the control point for the selective call receiver 700. Among other things, the processor 300 may control the receiver 20, demodulator 30, post detection filter 40 and symbol synchronizer 10.

The processor 300 compares received address information with predetermined addresses stored in the address memory 730 in order to trigger one of the alerts 740 or to display a received text or graphics message on display 750. In addition, messages are stored in a destination memory 760. The processor 300 also is connected to a power switch 770 to shut down the receiver 20 and other components of the selective call receiver during periods of time when the particular selective call receiver is not expected to receive information . A user interface to the selective call receiver 700 is achieved through selector switches 780. The selective call receiver may also have acknowledge-back or reverse channel transmitting capability, and accordingly may comprise a transmitter 790 and a transmitting antenna 792.

The series of equations and algorithms used in the processor 300 above can be implemented in many ways, such as by hardware circuits, a digital signal processor, computer software, microprocessor instructions, etc. Those ordinarily skilled in the art will appreciate that other methods, in addition to those mentioned, are equally suitable. All of the circuits shown as part of the simulcast detector 350 or processor 300 can be integrated onto a single application specific integrated circuit (ASIC), together with other signal processing functionalities.

Figure 4:
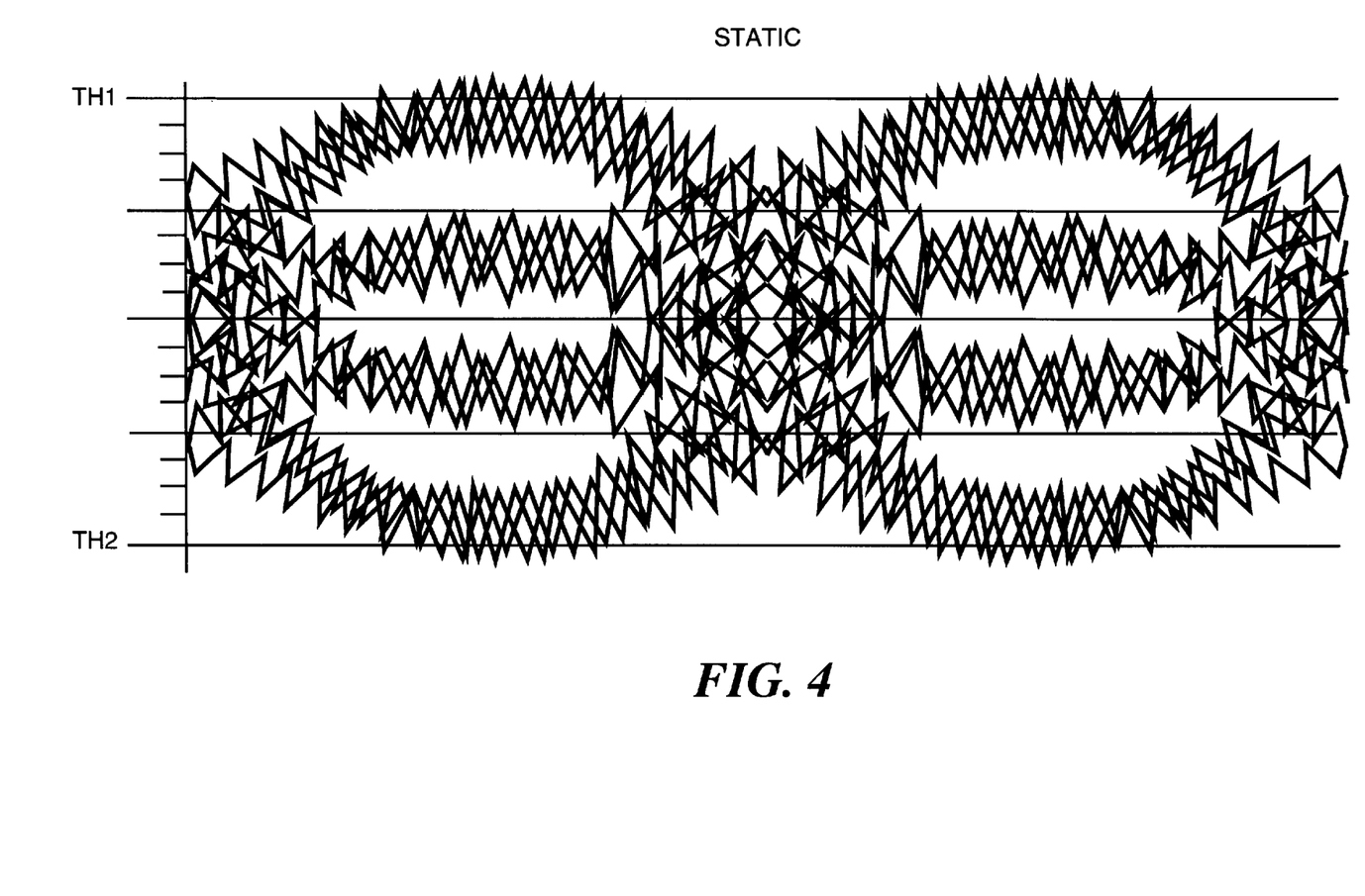
FIG. 4 is an "eye diagram" illustrating a signal in static conditions.
Figure 5:
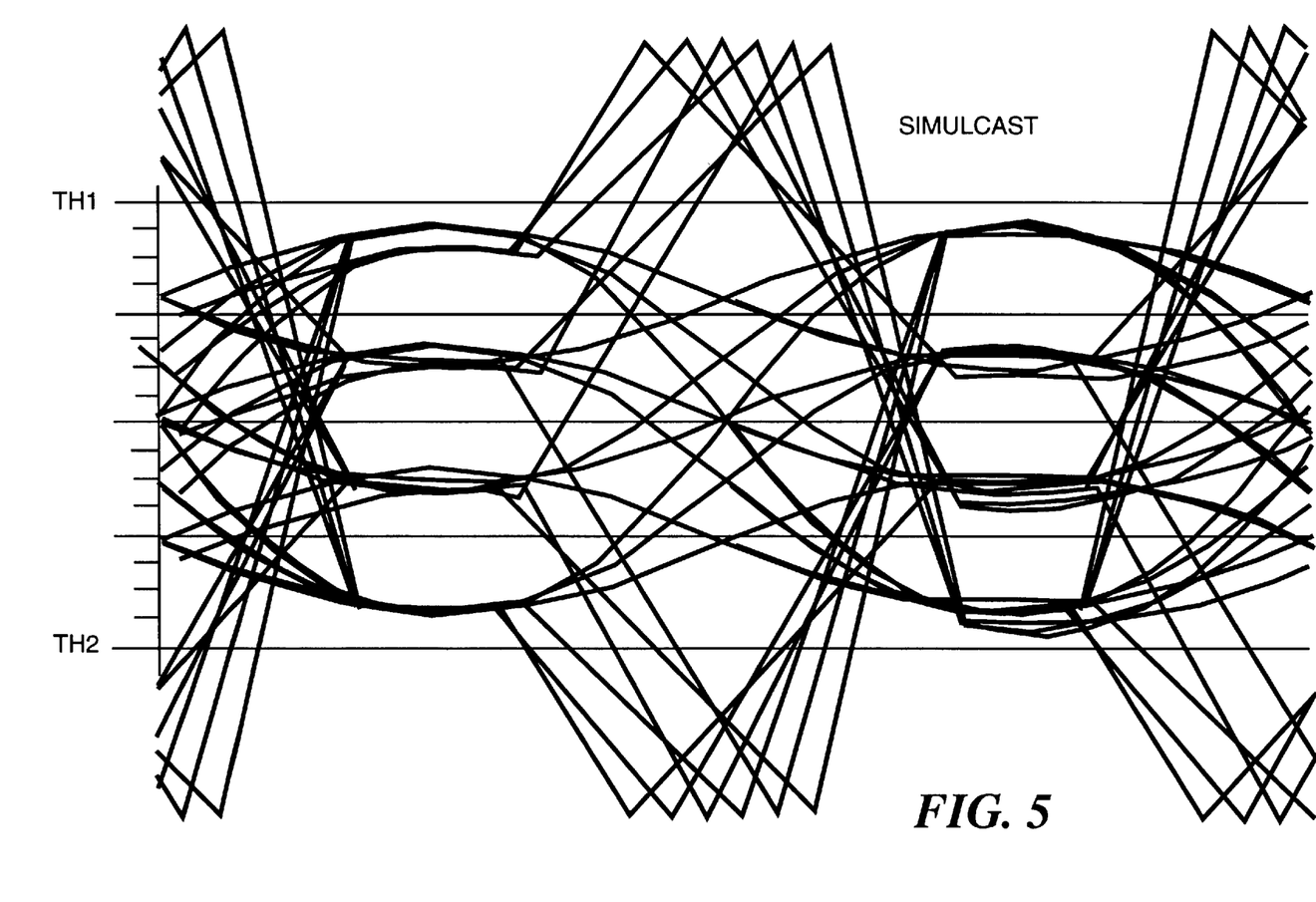
FIG. 5 is an "eye diagram" illustrating a signal in simulcast conditions.
Figure 6:
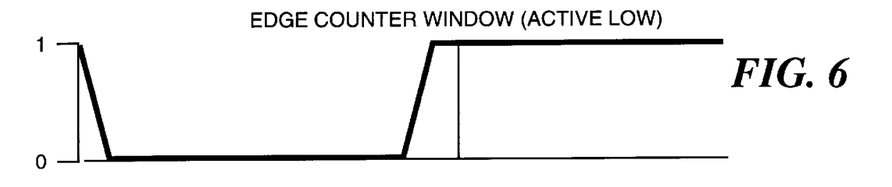
FIG. 6 is a plot for a edge window for single symbol time.
Figure 7:
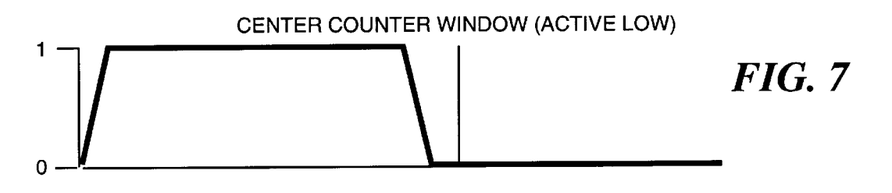
FIG. 7 is a plot for an center window for a single symbol time.
Figure 8:
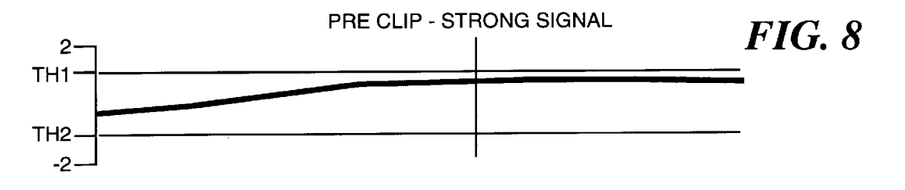
FIG. 8 is a plot for a typical strong static signal for a single symbol time.
Figure 9:
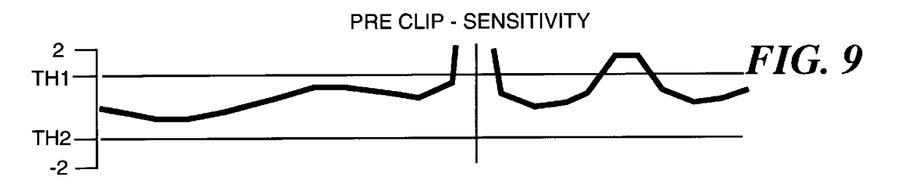
FIG. 9 is a plot for a typical weak static signal for a single symbol time.
Figure 10:
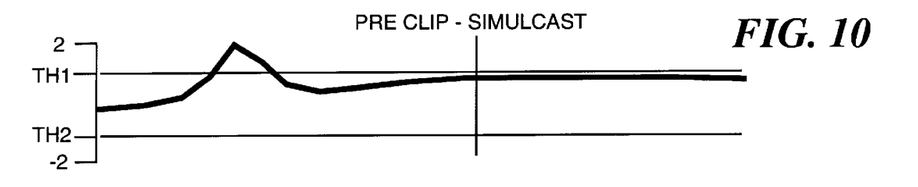
FIG. 10 is a plot for a typical simulcast signal for a single symbol time.

Generally, from typical eye diagrams examined, SDS distortion is localized to the symbol transitions and does not occur at or near the center of the symbol when looking at the output of the detector (PDF input). On the other hand, Static noise or Gaussian noise is generally evenly distributed along the entire symbol time including both the symbol center and symbol transition (or edge) areas. Referring to FIG. 4, an eye diagram of a weak static signal is shown where the number of excursions at the symbol centers through the thresholds TH1 and TH2 exceeds the number of excursions through these same thresholds at the symbol transition area. Referring to FIG. 5, an eye diagram of a simulcast signal is shown where the number of excursions at the symbol transition area through the thresholds TH1 and TH2 exceeds the number of excursions through these same thresholds at the symbol center areas. Referring to FIGS. 6–10, plots for a single symbol time for an edge window, a center window, a typical strong static signal, a typical weak static signal and a typical simulcast signal are shown respectively. Note that during the edge window, more excursions through the +2 threshold are found in the simulcast signal of FIG. 10 than the number of excursions through the +2 threshold during the same edge window period of the static (or sensitivity) signal of FIG. 9. Further note that the number of excursions through the +2 threshold during the center window period of the static signal of FIG. 9 exceeds the number of excursions through the +2 threshold of the simulcast signal of FIG. 10 during the same center window period. Although the characteristics shown in FIGS. 9 and 10 may not always be true for every single symbol time measured in an eye diagram, on average, this characteristic is quite pronounced and detectable. Thus, from these characteristics, measurements of excursions from predetermined thresholds at or above symbol centers or symbol edges (or transitions) provides adequate confirmation of the presence (or nonexistence) of a simulcast channel signal.

Eye diagrams for the detector/demodulator output (input into the post detection filter 40) for simulcast channels would illustrate how difficult it is to discern the "eyes" in a eye diagram. Zooming-in on the eye of a simulcast signal with SDS distortion shows that an open eye indeed exists at the output of the detector (PDF input). Applying this signal to the post detection filter (PDF) 40 results in the eye diagram at the PDF output to become further closed. This closure results from the energy of the transient generated at the symbol transitions (due to the SDS distortion) at the output of the detector being smeared/spread past the symbol transitions towards the center of the symbol as a result of the low pass PDF or integration.

For static channels the distortion occurs equally with respect to the symbol levels. In a static channel the distortion is Gaussian noise with a mean of 0. The distortion (variance of the noise) at or near the symbol transitions or symbol edge, while equal to that of the distortion at the symbol centers, does not cause excursions beyond the outer symbol levels to the extent of those occurring at or near the center of the symbol. This occurs since at or near the symbol edge boundary the signal is transitioning from one symbol to another a majority of the time.

So, by counting the number of times the signal at the output of the demodulator 30 (the PDF input) went above and below some predetermined upper and lower thresholds respectively at or near the symbol transition and separately counting the same at or near the symbol center one may determine if the signal were received in a simulcast environment or a static environment. Performing a running average of these counts over several symbol periods and comparing the center count threshold crossings to the edge (transition) count threshold crossings would give a control signal, essentially a signal like the simulcast control signal 380 previously discussed. This control signal could then be used to switch/modify/adapt various portions of the receiver in response to the detected channel condition. The control signal would be derived from the simple relational comparison of the center count and transition count as follows:

if center count>edge (transition) count Static Channel Detected if center count<edge (transition) count Simulcast Channel Detected Referring once again to FIG. 1, the simulcast detector 350 preferably requires the use of a synchronization algorithm which has some immunity to the distortion caused by SDS such as those described in docket number PT2636U. The selective call receiver would also preferably require the use of a digital frequency discriminator; such as a frequency demodulator or digitally adjustable detector (DAD) demodulator, as demodulator 30.

Figure 2:
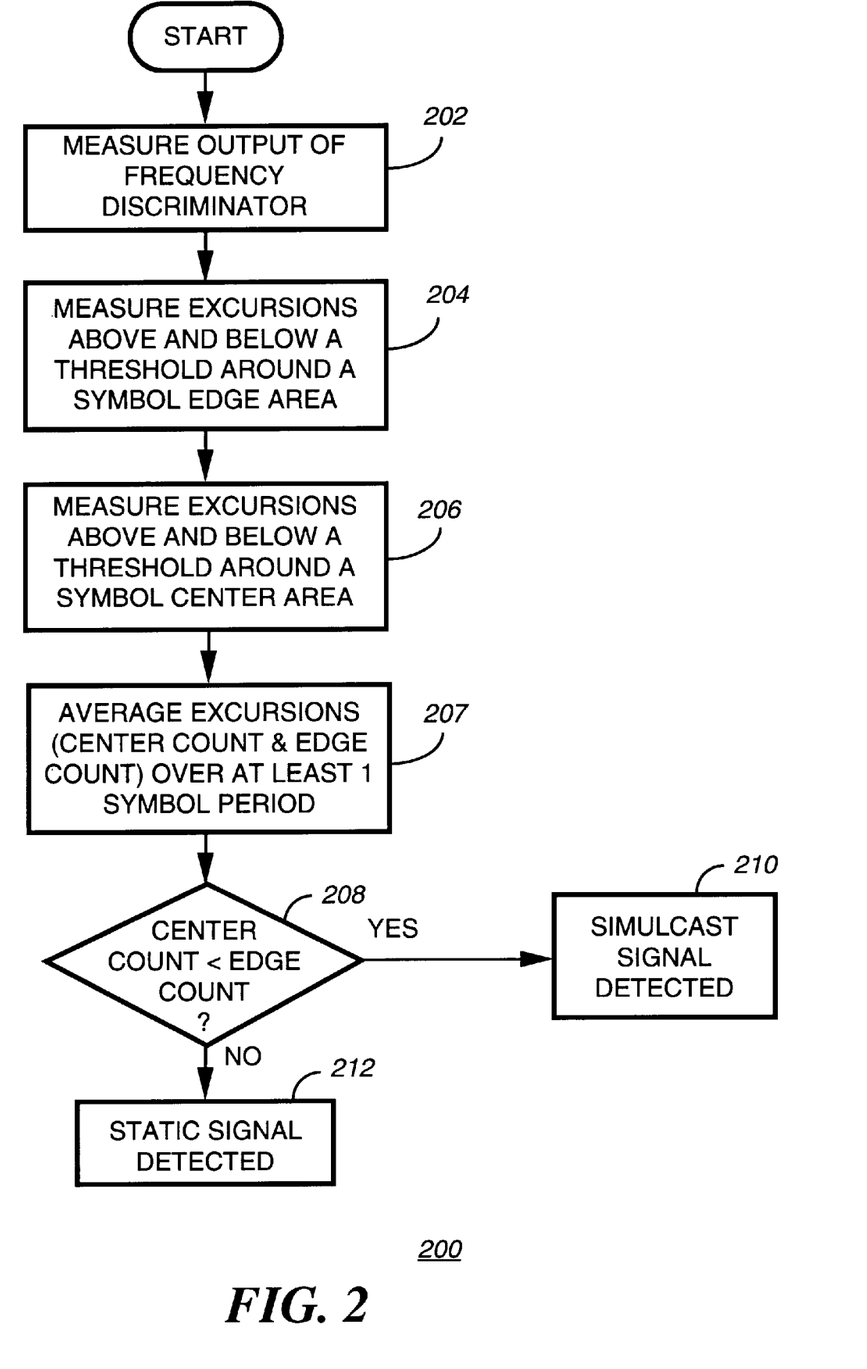
FIG. 2 is a flow chart illustrating a simulcast detection method in accordance with the present invention.

Referring to FIG. 2, a flow chart illustrating a method 200 for distinguishing between simulcast and non-simulcast signals at a selective call receiver is shown. Preferably, the method 200 comprises the steps of measuring the output of a frequency discriminator (or demodulator) coupled to the selective call receiver at a step 202 and identifying excursions above and below at least one predetermined threshold at steps 204 and 206. Preferably, the excursions are identified substantially at the symbol edge area providing an edge count at step 204 and substantially at the symbol center providing a center count at step 206. Further, the method further comprises the step 207 of averaging the excursions measured over at least one symbol period for both the center count and the edge count. Preferably, the step of measuring further comprises the step of measuring the transmissions at the output of the frequency discriminator but before a post detection filter. In addition, the method 200 could further comprise the steps of adjusting the at least one predetermined threshold or of adjusting a window size for sampling the excursions above and below at least one predetermined threshold or of adjusting a number of symbol periods to use for averaging the excursion measured. The method may further comprise the step after the averaging step (and a decision block 208) of providing a control signal by detecting a simulcast channel (step 210) if the center count is less than the edge count and detecting a static channel (step 212) if the center count is greater than the edge count.

Figure 3:
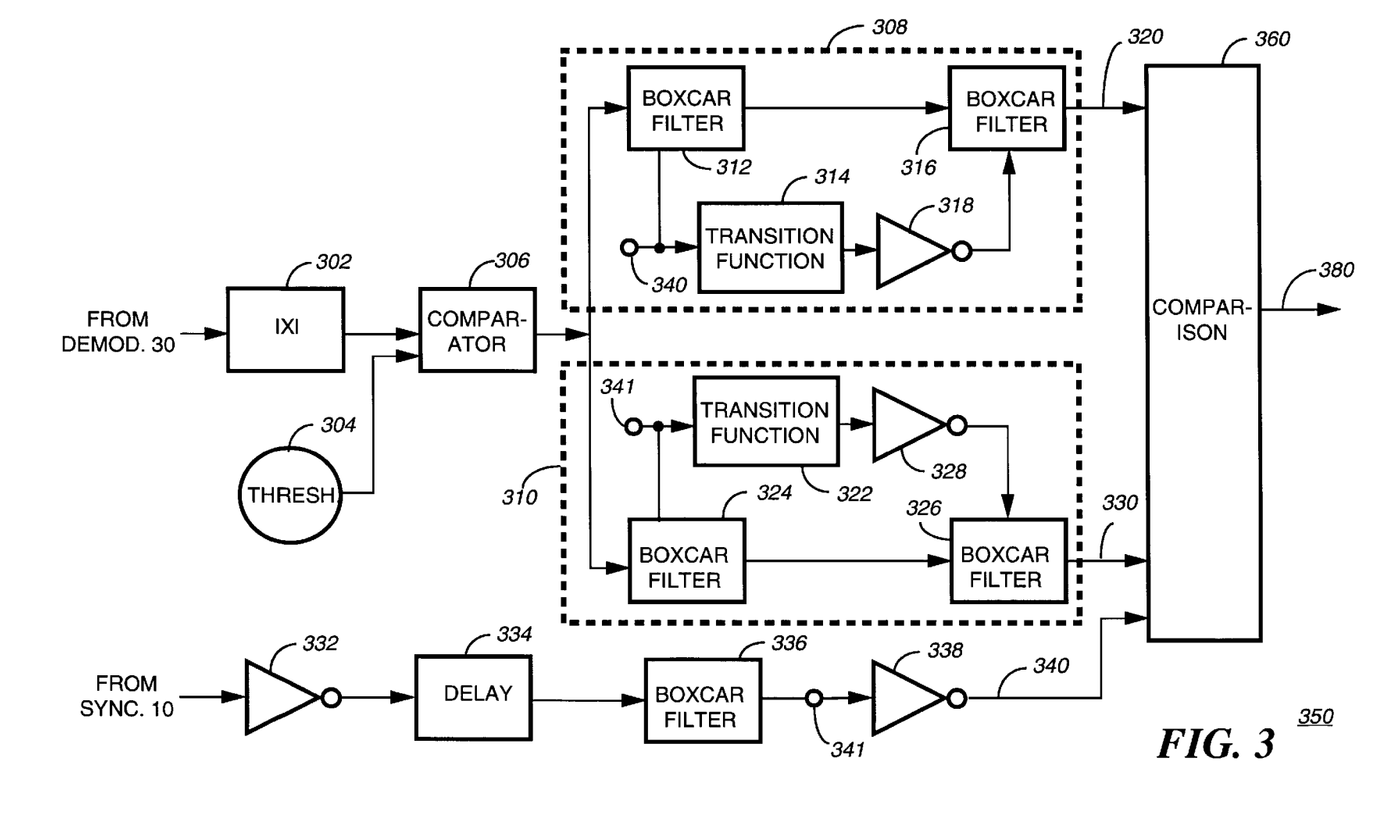
FIG. 3 is a block diagram of a simulcast detection circuit in accordance with the present invention.

FIG. 3 shows the detailed block diagram of a simulcast detector circuit 350 having center & transition (or edge) threshold counters. Preferably, the simulcast detector circuit comprises a symbol center averaging circuit 308 and a symbol edge averaging circuit 310. Preferably, the symbol center averaging circuit 308 provides a center count of excursions above and below at least a first predetermined threshold and provides a moving average of the center count over a predetermined number of symbol periods. The symbol edge averaging circuit 310 preferably provides an edge count of excursions above and below at least a second predetermined threshold and provides a moving average of the edge count over a predetermined number of symbol periods. Preferably, the output from the demodulator is passed through an absolute value function 302. The output of absolute value function 302 is compared to a threshold 304 using a comparator 306. The output from the comparator 306 is provided to a set of boxcar filters that form a portion of the circuits 308 and 310. The first boxcar filters 312 and 324 in the symbol center and edge averaging circuits respectively are used to count the number of threshold crossings in a symbol time at or near the center of the symbol and at or near the symbol transition respectively. Preferably, the threshold crossings are done substantially near a center of the symbol for the symbol center averaging circuit and substantially near an edge of a symbol for the symbol edge averaging circuit. In addition, the symbol center and edge averaging circuits 308 and 310 also respectively comprise transition algorithms or functions 314 and 322 along with respective inverters 318 and 328 to provide clocking for the moving average filters 316 and 326 respectively. The second boxcar filters 316 and 326 are used to form the moving average of the center and edge counts respectively over several symbol periods. The outputs from the second boxcar filters 316 and 326 provide the "center count" 320 and "edge count" 330 respectively to a simulcast comparison circuit 360 which then appropriately detects whether a simulcast condition exists. The simulcast comparison circuit 360 is preferably programmed to receive and compare the moving average of the center count and the moving average of the edge count to provide a control signal for simulcast detection. It should be understood that the simulcast comparison circuit can be embodied by a programmable processor or a variety of simpler circuits know in the art. It should also be understood that the present invention, although described in a digital embodiment, may be embodied with analog circuitry including the use of capacitors and charge pumps for at least one of the symbol center averaging and/or symbol edge averaging circuits. The sync input 340 is used to generate clocking signals used by the symbol center averaging circuit 308 while the sync input 341 is used to generate clocking signals used by the edge averaging circuit 310. The clocking signals clock the first set of boxcar filters for a predetermined fraction of a symbol time centered on the symbol center and symbol transition regions respectively. The clocking signals also clock the second set of boxcar filters which calculate the moving average of the center and transition counters over a predetermined number of symbols. Preferably, the circuit providing the sync input comprises an inverter 332 coupled to a digital delay device 334 coupled to a boxcar filter 336, which in turn is coupled to another inverter 338. The digital delay device 334 compensates for the group delay through the post detection filter so that the sync input provides appropriately aligned windows for symbol edge and symbol center measurements.

To demonstrate the concept, the center and edge counts each preferably have a 0.5 symbol window centered with respect to the symbol center and symbol edge for every symbol in which to count the excursions beyond the respective predetermined thresholds. In this case both center and transition threshold counters have their thresholds set to the equivalent of +/−6400 Hz (slightly above and below the FLEX™ deviations). Finally, the length of the moving average was set to the equivalent of 96 symbols. It should be understood that the thresholds and window widths for the threshold counters and the moving average length can be adjusted/optimized for best performance. For radios in which an automatic frequency controller (AFC) is not employed, the value of the DC offset estimation at the PDF output (i.e. Peak and Valley or Digital Frequency Correction (DFC) as used in a DAD) can be compensated for at the detector output by scaling the estimated offset value by the gain of the PDF and be reflected as adjustments to the thresholds.

The above description is intended by way of example only and is not intended to limit the present invention in any way except as set forth in the following claims.

What is claimed is:

1. A method for distinguishing between simulcast and non-simulcast signals at a selective call receiver, comprising the steps of:
   measuring the transmissions at the output of a frequency demodulator coupled to the selective call receiver;
   identifying excursions above and below at least one predetermined threshold, substantially at the symbol edge area providing an edge count and substantially at the symbol center providing a center count; and
   averaging the excursions measured over at least one symbol period for both the center count and the edge count.

2. The method of claim 1, wherein the step of measuring further comprises the step of measuring the transmissions at the output of the frequency demodulator but before a post detection filter.

3. The method of claim 1, wherein the method further comprises the step of adjusting the at least one predetermined threshold.

4. The method of claim 1, wherein the method further comprises the step of adjusting a window size for sampling the excursions above and below at least one predetermined threshold.

5. The method of claim 1, wherein the method further comprises the step of adjusting a number of symbol periods to use for averaging the excursion measured.

6. The method of claim 1, wherein the method further comprises the step of comparing the center count with the edge count after the step of averaging the excursions.

7. The method of claim 6, wherein the method further comprises the step after the averaging step and comparing step of providing a control signal by detecting a simulcast channel if the center count is less than the edge count and detecting a static channel if the center count is greater than the edge count.

8. A circuit for detecting simulcast channel conditions, comprising:
   a symbol center averaging circuit for providing a center count of excursions above and below at least a first predetermined threshold and for providing a moving average of the center count over a predetermined number of symbol periods;
   a symbol edge averaging circuit for providing an edge count of excursion above and below at least a second predetermined threshold and for providing a moving average of the edge count over a predetermined number of symbol periods; and
   a comparison circuit to receive and compare the moving average of the center count and the moving average of the edge count to provide a control signal for simulcast detection.

9. The circuit of claim 8, wherein the symbol center averaging circuit comprises a first circuit used for counting a number of threshold crossings in a symbol time substantially near a center of the symbol.

10. The circuit of claim 9, wherein the symbol center averaging circuit further comprises a second filter used for providing a moving average of the center count over a predetermined symbol period.

11. The circuit of claim 8, wherein the symbol edge averaging circuit comprises a first filter used for counting a number of threshold crossings in a symbol time substantially near an edge of the symbol.

12. The circuit of claim 11, wherein the symbol edge averaging circuit further comprises a second filter used for providing a moving average of the edge count over a predetermined symbol period.

13. The circuit of claim 8, wherein the circuit further comprises a sync input for generating clocking signals used by the symbol center averaging circuit and the symbol edge averaging circuit wherein the clocking signals indicate a predetermined fraction of a symbol time centered on a symbol center and a symbol edge.

14. A selective call receiver unit capable of detecting a simulcast channel transmission, comprising a selective call receiver;

a demodulator coupled to the selective call receiver; and a circuit coupled to the demodulator for detecting simulcast channel conditions, comprising:

a symbol center averaging circuit for providing a center count of excursions above and below at least a first predetermined threshold and for providing a moving average of the center count over a predetermined number of symbol periods;

a symbol edge averaging circuit for providing an edge count of excursions above and below at least a second predetermined threshold and for providing a moving average of the edge count over a predetermined number of symbol periods; and a comparison circuit to receive and compare the moving average of the center count and the moving average of the edge count to provide a control signal for simulcast detection.

15. The selective call receiver unit of claim 14, wherein the circuit further comprises a sync input for generating clocking signals used by the symbol center averaging circuit and the symbol edge averaging circuit wherein the clocking signals indicate a predetermined fraction of a symbol time centered on a symbol center and a symbol edge.

16. The selective call receiver unit of claim 14, wherein the selective call receiver unit further comprises a post detection filter coupled to the output of the demodulator.

17. The selective call receiver unit of claim 14, wherein the selective call receiver unit further comprises a synchronizer coupled to at least one of the symbol center averaging circuit or the symbol edge averaging circuit.

18. The selective call receiver unit of claim 17, wherein the synchronizer reliably determines an edge and a center of a symbol by accounting for any delay between the demodulator and the synchronizer.

19. The selective call receiver unit of claim 14, wherein at least one of the symbol center averaging circuit and the symbol edge averaging circuit use a capacitor and a charge pump.

* * * * *